(12) United States Patent
Hsu

(10) Patent No.: US 10,534,211 B2
(45) Date of Patent: Jan. 14, 2020

(54) DISPLAY

(71) Applicant: Chiun Mai Communication Systems, Inc., New Taipei (TW)

(72) Inventor: Chen-Sheng Hsu, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 125 days.

(21) Appl. No.: 15/459,848

(22) Filed: Mar. 15, 2017

(65) Prior Publication Data

US 2017/0276994 A1 Sep. 28, 2017

(30) Foreign Application Priority Data

Mar. 25, 2016 (CN) .......................... 2016 1 0174903

(51) Int. Cl.
*G02F 1/1333* (2006.01)
*F21V 8/00* (2006.01)

(52) U.S. Cl.
CPC ..... *G02F 1/133308* (2013.01); *G02B 6/0051* (2013.01); *G02B 6/0053* (2013.01); *G02B 6/0055* (2013.01)

(58) Field of Classification Search
CPC ............ G02F 1/133308; G02B 6/0055; G02B 6/0053; G02B 6/0051
USPC .......................................................... 349/58
See application file for complete search history.

(56) References Cited

U.S. PATENT DOCUMENTS

2014/0176485 A1* 6/2014 Holmberg ............... G06F 3/041
345/174
2016/0320658 A1* 11/2016 Reightler .......... G02F 1/133308

FOREIGN PATENT DOCUMENTS

| CN | 203535334 U | 4/2014 |
| CN | 204853144 U | 12/2015 |
| EP | 0817110 A2 | 1/1998 |

* cited by examiner

*Primary Examiner* — Nathanael R Briggs
*Assistant Examiner* — William D Peterson
(74) *Attorney, Agent, or Firm* — ScienBiziP, P.C.

(57) ABSTRACT

A geometrically true and perfectly flat display screen includes a first frame, a backlight module and a first bolster. The backlight module is received in the first frame and includes a reflector plate at a lower portion of the backlight module. The first bolster is directly attached to the reflector plate.

19 Claims, 5 Drawing Sheets

DISPLAY

FIELD

The subject matter herein generally relates to assembly of a touch display to a device.

BACKGROUND

Many electronic devices include a touch display. Gummed foam can be used to attach the display. However, the foam may not be attached to the frame perfectly, which may create bubbles between the foam and the frame, and further cause ripples on the display.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

Figure 1:
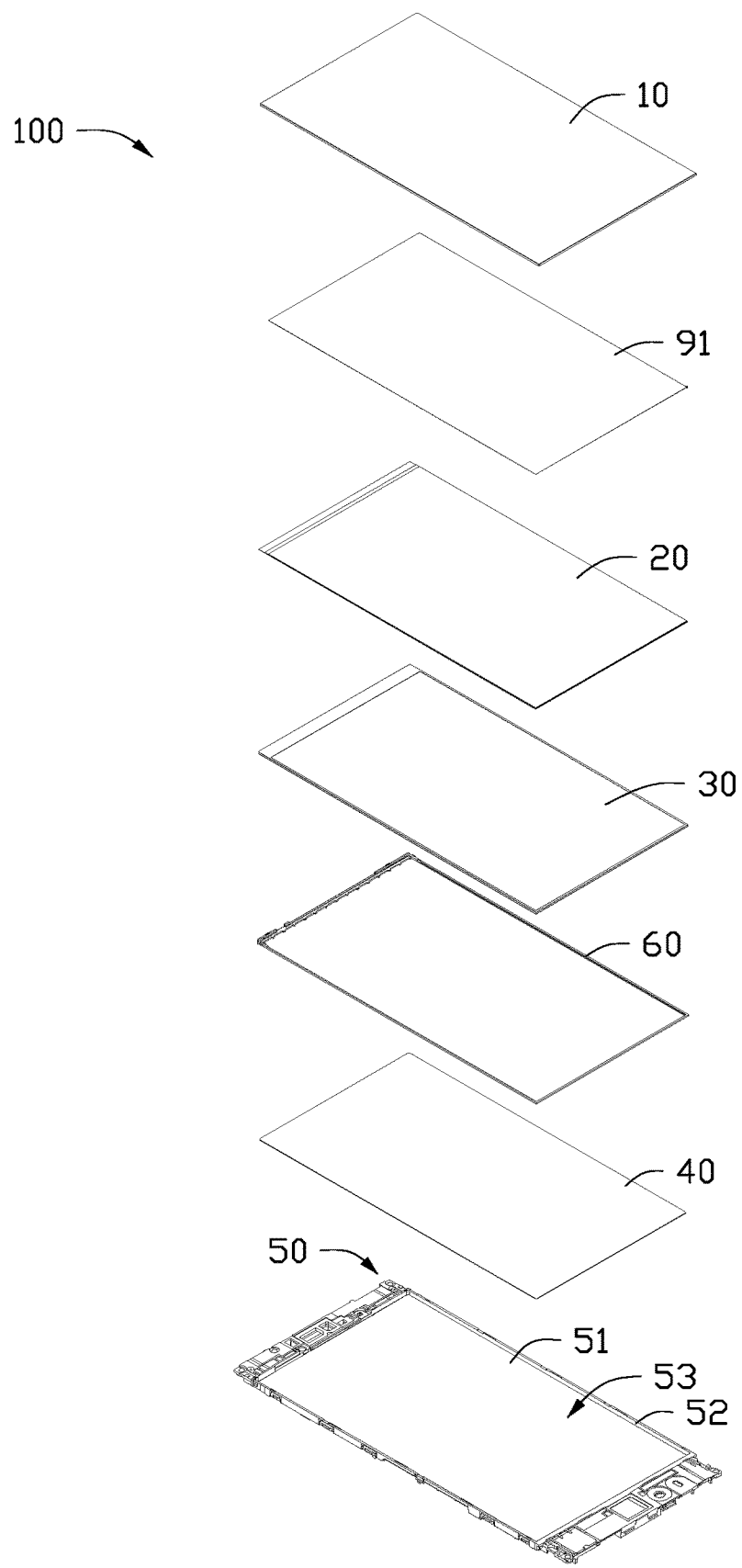
FIG. 1 is an exploded view of a first exemplary embodiment of a display screen.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

Figure 2:
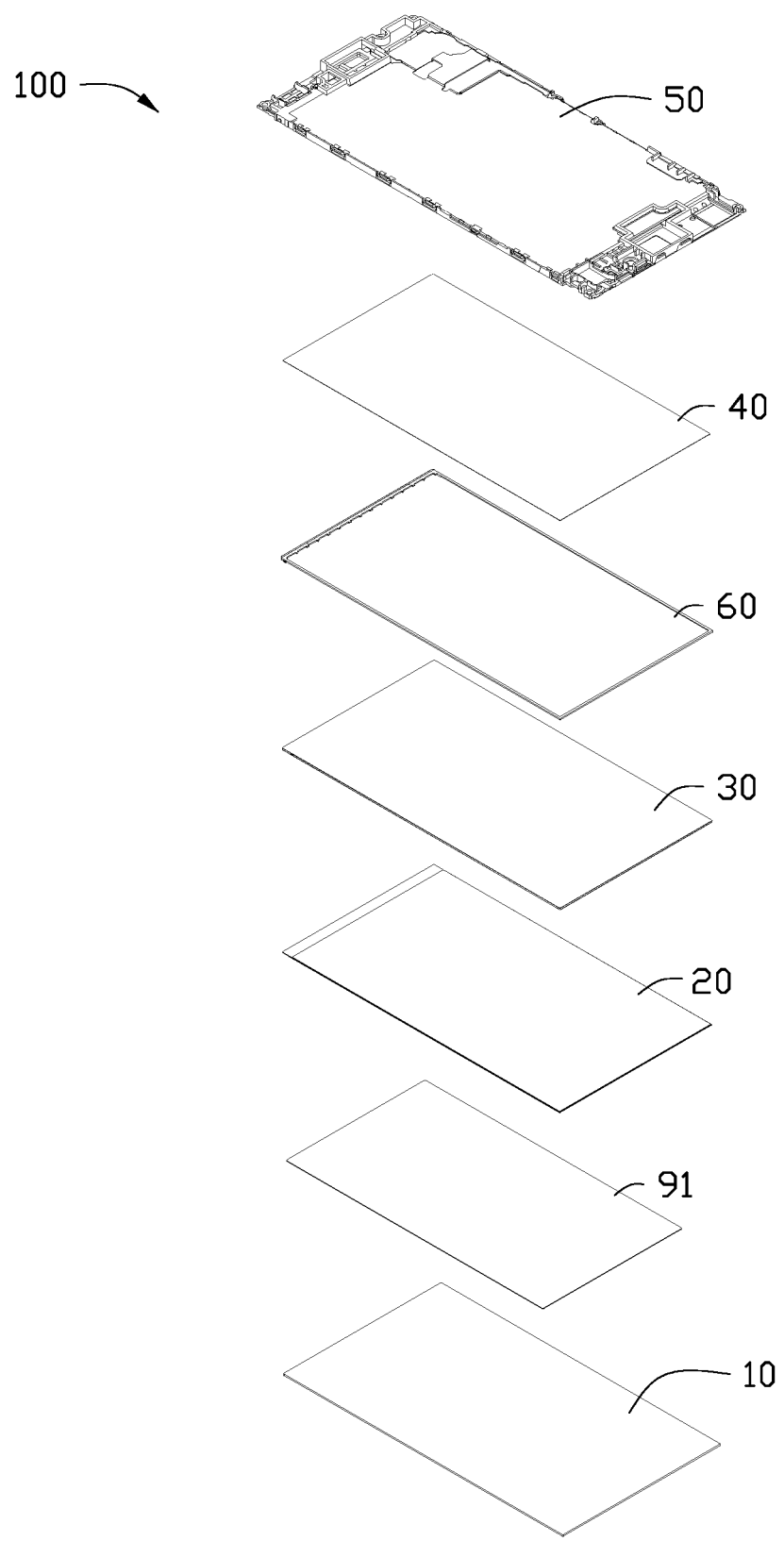
FIG. 2 is another exploded view of the display screen of FIG. 1.

FIGS. 1 and 2 illustrate a display 100. The display 100 can be a touch display for a mobile phone, a computer, a television or a play station. The display 100 includes a base board 10, a display panel 20, a backlight module 30, a first bolster 40, a first frame 50 and a second frame 60.

Figure 3:
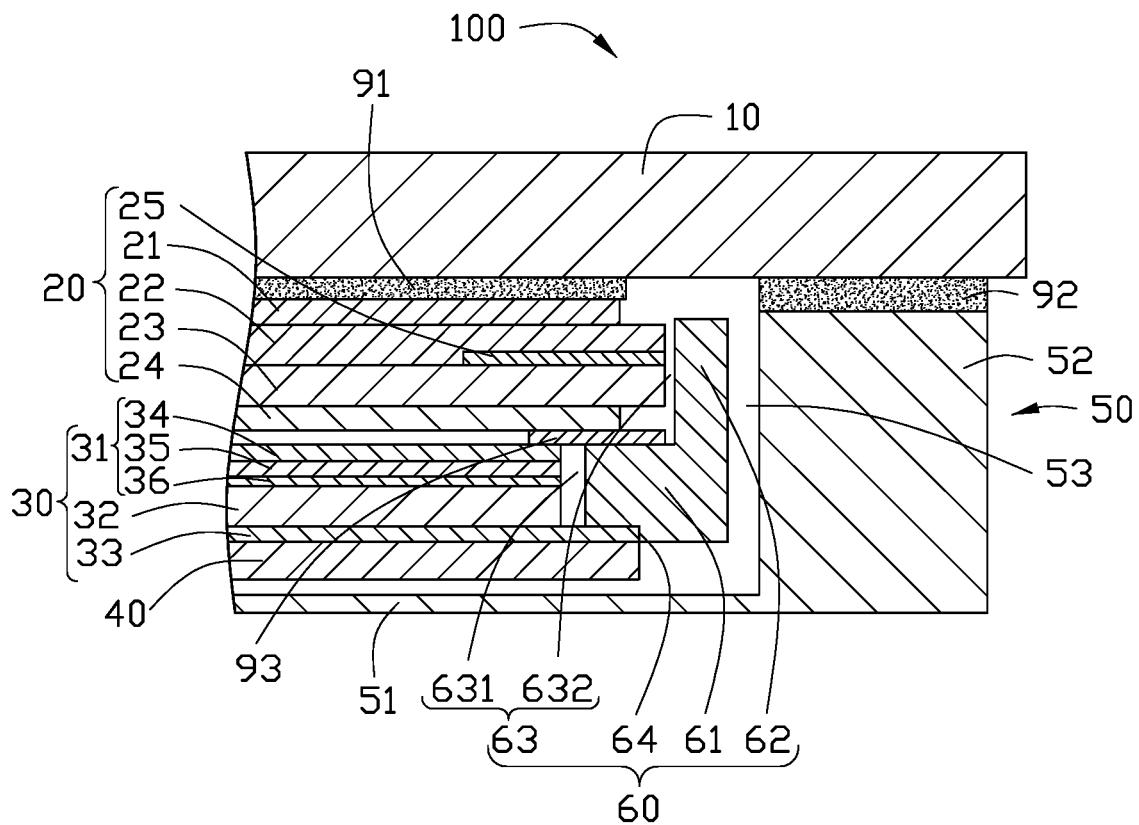
FIG. 3 is a cross-sectional view of a portion of the display screen of FIG. 1.

FIG. 3 illustrates that the base board 10 is parallel to and overlaps above the display panel 20. The base board 10 is substantially rectangular and has a size larger than that of the display panel 20. The base board 10 is made of transparent material, such as glass or ceramic.

The display panel 20 is preferably a liquid crystal display (LCD) panel. The display panel 20 includes an upper polarizer 21, a color filter (CF) 22, a thin film transistor layer 23 and a lower polarizer 24 in parallel in the exemplary embodiment. The upper polarizer 21 is stacked on the color filter 22, the color filter 22 is stacked on the thin film transistor layer 23, and the thin film transistor layer 23 is stacked on the lower polarizer 24. The base board 10 is attached to the upper polarizer 21 through a first glue layer 91. The first glue layer 91 has substantially the same shape and size as the upper polarizer 21, which is arranged between the base board 10 and the upper polarizer 21. Preferably, the first glue layer 91 is an optical adhesive. The upper polarizer 21 has substantially the same shape and size as the lower polarizer 24. The color filter 22 has substantially the same shape and size as the thin film transistor layer 23. The size of the upper polarizer 21 is smaller than the size of the color filter 22. The color filter 22 includes a shading portion 25 configured to prevent light leakage and improve color contrast ratio. The shading portion 25 is on a surface of the color filter 22 facing the thin film transistor layer 23. Preferably, the shading portion 25 is a black matrix.

The backlight module 30 is arranged below the display panel 20. The backlight module 30 includes an optical film 31, a light guide plate (LGP) 32 and a reflector plate 33 in parallel. The optical film is stacked on the light guide plate, and the light guide plate is stacked on the reflector plate. The optical film 31 has substantially the same shape and size as the light guide plate 32 and is smaller than the reflector plate 33. The optical film 31 includes an upper brightness enhancement film 34, a lower brightness enhancement film 35 and a diffuser 36 in parallel. The upper brightness enhancement film 34 is stacked on the lower brightness enhancement film 35, and the lower brightness enhancement film 35 is stacked on the diffuser 36. The upper brightness enhancement film 34, the lower brightness enhancement film 35 and the diffuser 36 have substantially similar shapes and sizes.

The first bolster 40 is parallel to the optical film 31 and directly attached to a bottom surface of the reflector plate 33. The first bolster 40 has substantially similar shape and size as the reflector plate 33. The first bolster 40 is adhesive and can attach to the bottom surface of the reflector plate 33. In at least one exemplary embodiment, the first bolster 40 can be made of acrylic foam.

The first frame 50 has an opening for receiving the display panel 20, the backlight module 30, the first bolster 40 and the second frame 60. The first frame 50 includes a bottom board 51, a peripheral wall 52, and a receiving portion 53. The bottom board 51 is parallel to the first bolster 40. The peripheral wall 52 surrounds the bottom board 51. The bottom board 51 and the peripheral wall 52 enclose the receiving portion 53 for receiving the display panel 20, the backlight module 30, the first bolster 40 and the second frame 60. The bottom board 51 is arranged below the first bolster 40 and spaced from the first bolster 40. The peripheral wall 52 surrounds the display panel 20 and the backlight module 30. A top of the peripheral wall 52 and the bottom surface of the base board 10 are attached together through a second glue layer 92. The second glue layer 92 thus defines an enclosed space between the peripheral wall 52 and the base board 10. The second glue layer 92 is a hollow rectangular sheet of similar size as the peripheral wall 52. Preferably, the second glue layer 92 is a gum layer, but is not limited to the exemplary embodiment herein.

The second frame 60 receives the display panel 20 and the backlight module 30, the display panel 20 and the backlight module 30 cooperatively form an integral display module. The second frame 60 includes a bottom portion 61, a side portion 62 and a receiving portion 63. The bottom portion 61 is hollow and defines a first receiving section 631 in the middle of the bottom portion 61. The side portion 62 is formed to perpendicularly surround a periphery of the bottom portion 61. The side portion 62 defines a second receiving section 632 in the middle of the side portion 62. The receiving portion 63 includes the first receiving section 631 and the second receiving section 632, the first receiving section 631 and the second receiving section 632 respectively receive the backlight module 30 and the display panel 20. The bottom portion 61 is located below the lower polarizer 24 and surrounds the backlight module 30. A top surface of the bottom portion 61 is parallel to the top surface of the upper brightness enhancement film 34, and a bottom surface of the bottom portion 61 is parallel to the bottom surface of the reflector plate 33. An adhesive tape 93 is arranged between the top surface of the bottom portion 61, the top surface of the upper brightness enhancement film 34 and the bottom surface of the lower polarizer 24. The tape 93 secures these components together and prevents light leakage therebetween. The adhesive tape 93 is substantially a rectangular sheet and covers a gap between the bottom portion 61 and the upper brightness enhancement film 34. Preferably, the adhesive tape 93 is a shading adhesive tape. The bottom portion 61 is spaced from the bottom board 51. The bottom surface of the bottom portion 61 defines a groove 64 in air communication with the receiving portion 63. The groove 64 receives the reflector plate 33. Preferably, a size of the groove 64 is similar to that of the reflector plate 33, and a size of the first bolster 40 is greater than that of the reflector plate 33. The first bolster 40 is coupled to the bottom portion 61.

In the first exemplary embodiment, the first bolster 40 is attached to the reflector plate 33 by its own viscosity. Uniform and precise flatness is achieved between the first bolster 40 and the reflector plate 33 and no bubbles are generated. The display 100 is not rippled and has improved shockproofing and impact resistance.

Figure 4:
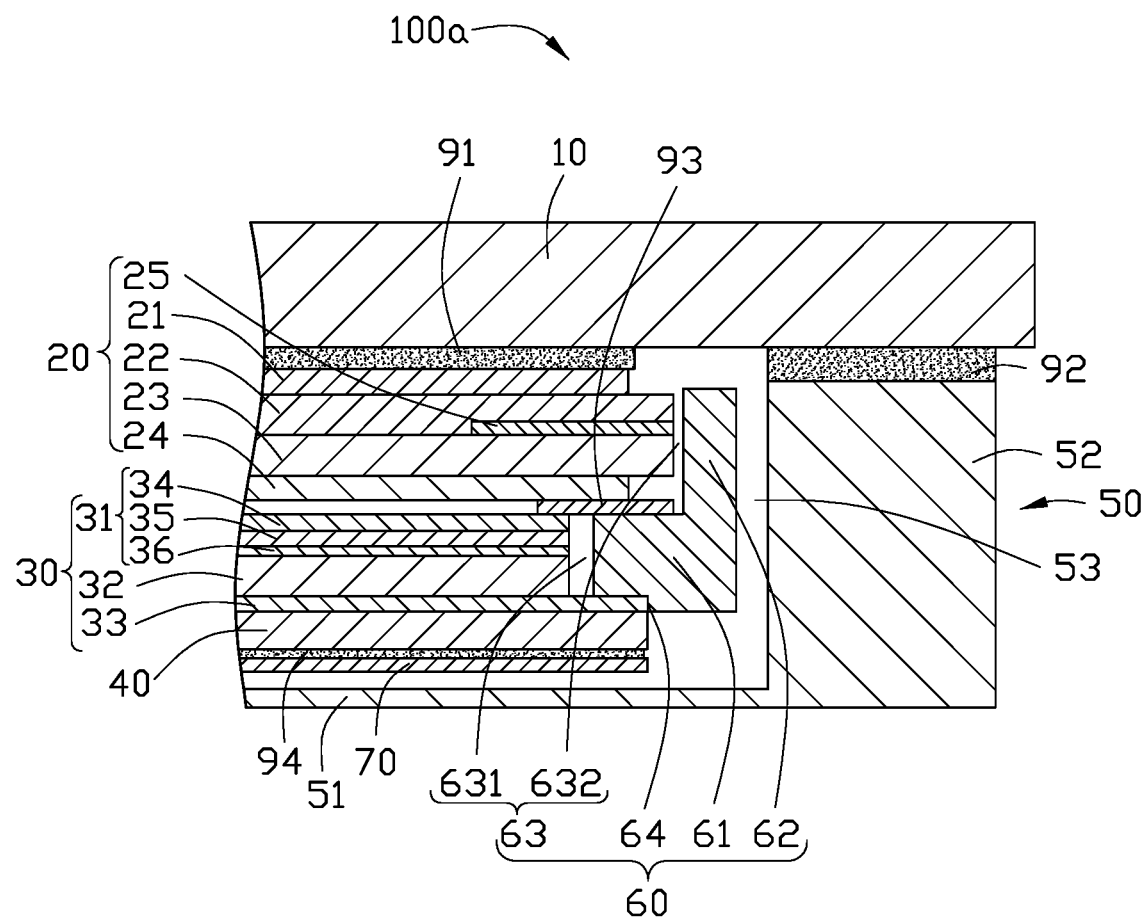
FIG. 4 is a cross-sectional view of a portion of a second exemplary embodiment of the display screen.

FIG. 4 illustrates a second exemplary embodiment of a display 100*a*, which is structurally similar to the first exemplary embodiment. Particularly, the display 100*a* further includes a sensor film 70. Preferably, the sensor film 70 is a touch force sensor film. The sensor film 70 is attached to the first bolster 40 through a third glue layer 94 and spaced from the bottom board 51. Preferably, the third glue layer 94 is a gum layer. The sensor film 70 is configured to detect force on the display 100*a*. When the display 100*a* receives an external force, the first bolster 40 deforms accordingly, the sensor film 70 detects the force and outputs feedback signals.

In the second exemplary embodiment, one side of the first bolster 40 is attached to the reflector plate 33 according to its own viscosity. Another side of the first bolster 40 is attached to the sensor film 70. Microscopic flatness between the first bolster 40 and the reflector plate 33 is thus ensured and no bubbles are generated.

Figure 5:
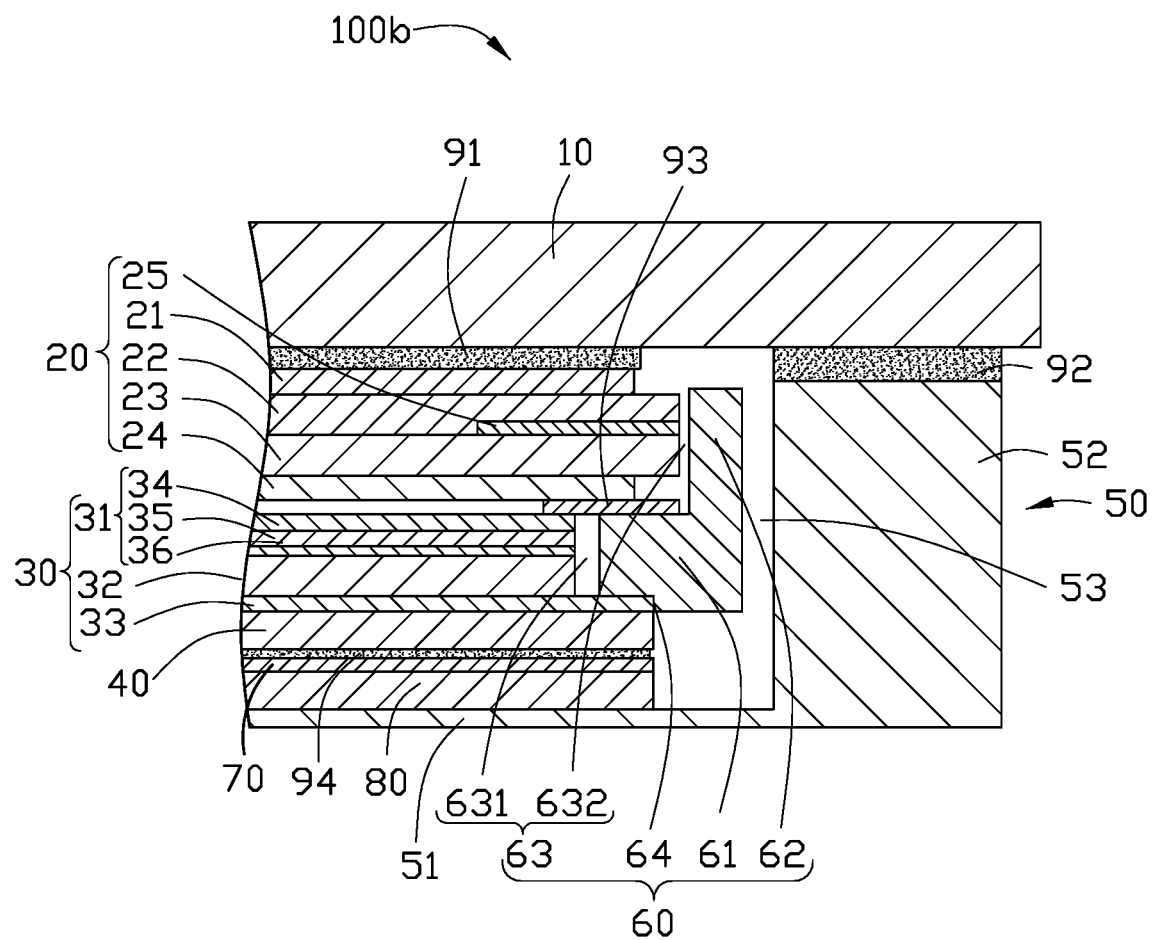
FIG. 5 is a cross-sectional view of a portion of a third exemplary embodiment of the display screen.

FIG. 5 illustrates a third exemplary embodiment of a display 100*b*, which is structurally similar to the second exemplary embodiment. Particularly, the display 100*b* further includes a second bolster 80. The second bolster 80 is sandwiched between the sensor film 70 and the bottom board 51. Additionally, the second bolster 80 is viscous and sticks between the sensor film 70 and the bottom board 51. In the third exemplary embodiment, the second bolster 80 is made of acrylic foam of substantially the same size as the first bolster 40. The display 100*b* of the third exemplary embodiment increases a buffering or shock-absorbing effect by arranging the second bolster 80 between the sensor film 70 and the bottom board 51.

In the third exemplary embodiment of a display 100*b* the first bolster 40 is again attached to the reflector plate 33 according to its own viscosity.

It is believed that the exemplary embodiments and their advantages will be understood from the foregoing description, and it will be apparent that various changes may be made thereto without departing from the scope of the disclosure or sacrificing all of its advantages. The examples herein described are mere illustrative exemplary embodiments of the disclosure.

What is claimed is:

1. A display comprising:
   a first frame;
   a backlight module received in the first frame and comprising a reflector plate at a lower portion of the backlight module;
   a first bolster directly attached to the reflector plate;
   a sensor film attached to the first bolster and spaced from the first frame; and
   a second bolster sandwiched between the sensor film and the first frame; wherein the first bolster and the second bolster are made of acrylic foam and the first bolster and the second bolster are respectively attached to opposite sides of the sensor film.

2. The display as claimed in claim 1, wherein the first bolster is spaced from the first frame.

3. The display as claimed in claim 1, wherein the sensor film is coupled to the first bolster through a third glue layer, the sensor film detects force on the display.

4. The display as claimed in claim 1, wherein the second bolster has a same size as the first bolster.

5. The display as claimed in claim 1, wherein the backlight module further comprises an optical film and a light guide plate (LGP) in parallel with the reflector plate, the optical film is stacked on the light guide plate, the light guide plate is stacked on the reflector plate, the first bolster is attached to a bottom surface of the reflector plate.

6. The display as claimed in claim 5, wherein the first bolster is adhesive, the first bolster is made of acrylic foam.

7. The display as claimed in claim 5, wherein the optical film comprises an upper brightness enhancement film, a lower brightness enhancement film and a diffuser in parallel, the upper brightness enhancement film is stacked on the lower brightness enhancement film, the lower brightness enhancement film is stacked on the diffuser, the light guide plate is coupled to a bottom surface of the diffuser.

8. The display as claimed in claim 7, wherein the display panel comprises an upper polarizer, a color filter (CF), a thin film transistor layer and a lower polarizer in parallel, the upper polarizer is stacked on the color filter, the color filter is stacked on the thin film transistor layer, and the thin film transistor layer is stacked on the lower polarizer, the lower polarizer is spaced from the upper brightness enhancement film.

9. The display as claimed in claim 8, wherein a size of the upper polarizer is smaller than a size of the color filter, the color filter comprises a shading portion configured to prevent light leakage and improve color contrast ratio, the shading portion is on a surface of the color filter facing the thin film transistor layer.

10. The display as claimed in claim 9, wherein the shading portion is a black matrix, the upper polarizer has substantially the same shape and size as the lower polarizer, the color filter has substantially the same shape and size as the thin film transistor layer.

11. The display as claimed in claim 9, further comprising a second frame, wherein the first frame has an opening for receiving the display panel, the backlight module, the first bolster, and the second frame, wherein the first frame comprises a bottom board, a peripheral wall and a receiving portion, the bottom board is parallel to the first bolster, the peripheral wall surrounds the bottom board, the bottom board and the peripheral wall enclose the receiving portion for receiving the display panel, the backlight module, the first bolster and the second frame.

12. The display as claimed in claim 11, wherein the bottom board is arranged below the first bolster and spaced from the first bolster, the peripheral wall surrounds the display panel and the backlight module, a top of the peripheral wall and the bottom surface of the base board are attached together through a second glue layer, and the second glue layer defines an enclosed space between the peripheral wall and the base board.

13. The display as claimed in claim 12, wherein the base board is coupled to the upper polarizer through a first glue layer, the first glue layer has substantially the same shape and size as the upper polarizer; the second glue layer is a hollow rectangular sheet and has substantially similar size as the peripheral wall; the first glue layer is an optical adhesive, the second glue layer is a gum layer.

14. The display as claimed in claim 12, wherein the second frame receives the display panel and the backlight module, the second frame includes a bottom portion, a side portion and a receiving portion, wherein the bottom portion is hollow and defines a first receiving section in the middle of the bottom portion, the side portion is formed to perpendicularly surround a periphery of the bottom portion, the side portion defines a second receiving section in the middle of the side portion.

15. The display as claimed in claim 14, wherein the receiving portion comprises the first receiving section and the second receiving section, the first receiving section and the second receiving section respectively receive the backlight module and the display panel.

16. The display as claimed in claim 14, wherein the bottom portion is located below the lower polarizer and surrounds the backlight module, a top surface of the bottom portion is parallel to the top surface of the upper brightness enhancement film, a bottom surface of the bottom portion is parallel to the bottom surface of the reflector plate.

17. The display as claimed in claim 16, wherein an adhesive tape is arranged between the top surface of the bottom portion, the top surface of the upper brightness enhancement film and the bottom surface of the lower polarizer, the adhesive tape is configured to fasten a connection and prevent light leakage between the bottom portion and the lower polarizer and between the upper brightness enhancement film and the lower polarizer; the adhesive tape is a rectangular sheet and covers a gap between the bottom portion and the upper brightness enhancement film; the adhesive tape is a shading adhesive tape.

18. The display as claimed in claim 17, wherein the bottom portion is spaced from the bottom board, the bottom surface of the bottom portion defines a groove in air communication with the receiving portion, the groove receives the reflector plate; the first bolster is coupled to the bottom portion.

19. The display as claimed in claim 11, wherein the second frame includes a bottom portion, a side portion and a receiving portion, wherein the bottom portion is hollow and defines a first receiving section in the middle of the bottom portion, the side portion is formed to perpendicularly surround a periphery of the bottom portion, the side portion defines a second receiving section in the middle of the side portion, the bottom portion defines a groove air communicating with the receiving portion, the groove receives the reflector plate, and the reflector plate resists against the second frame.

* * * * *